(12) United States Patent
Hiran et al.

(10) Patent No.: US 10,452,463 B2
(45) Date of Patent: Oct. 22, 2019

(54) PREDICTIVE ANALYTICS ON DATABASE WAIT EVENTS

(71) Applicant: AppDynamics LLC, San Francisco, CA (US)

(72) Inventors: Apun Hiran, Pleasanton, CA (US); Ido Carmel, Mountain View, CA (US); Sanjay Nagaraj, Dublin, CA (US)

(73) Assignee: Cisco Technology, Inc., San Jose, CA (US)

( * ) Notice: Subject to any disclaimer, the term of this patent is extended or adjusted under 35 U.S.C. 154(b) by 72 days.

(21) Appl. No.: 15/224,560

(22) Filed: Jul. 31, 2016

(65) Prior Publication Data

US 2018/0032387 A1 Feb. 1, 2018

(51) Int. Cl.
*G06F 11/07* (2006.01)
*G06F 11/30* (2006.01)
*G06F 11/34* (2006.01)
*G06N 20/00* (2019.01)

(52) U.S. Cl.
CPC ........ *G06F 11/079* (2013.01); *G06F 11/3006* (2013.01); *G06F 11/3442* (2013.01); *G06F 11/3447* (2013.01); *G06F 2201/80* (2013.01); *G06F 2201/86* (2013.01); *G06N 20/00* (2019.01)

(58) Field of Classification Search
CPC ............... G06F 11/079; G06F 11/0745; G06F 11/0754; G06F 11/0772; G06F 11/0793; G06N 99/005
See application file for complete search history.

(56) References Cited

U.S. PATENT DOCUMENTS

| | | | | |
|---|---|---|---|---|
| 7,376,682 B2* | 5/2008 | Ramacher | ......... | G06F 17/30008 |
| 7,673,291 B2* | 3/2010 | Dias | .................. | G06F 17/30306 |
| | | | | 714/38.1 |
| 7,774,312 B2* | 8/2010 | Ngai | ................. | G06F 17/30306 |
| | | | | 707/637 |
| 8,015,454 B1* | 9/2011 | Harrison | ............. | G06F 11/3409 |
| | | | | 714/47.3 |
| 8,156,421 B2* | 4/2012 | Chhajer | ............ | G06F 17/30306 |
| | | | | 715/227 |
| 8,347,148 B1* | 1/2013 | Harrison | ............. | G06F 11/3409 |
| | | | | 714/47.2 |
| 8,887,009 B1* | 11/2014 | Harrison | ............. | G06F 11/3409 |
| | | | | 714/47.3 |
| 9,477,692 B2* | 10/2016 | Beresniewicz | ... | G06F 17/30306 |

(Continued)

*Primary Examiner* — Nadeem Iqbal
(74) *Attorney, Agent, or Firm* — Behmke Innovation Group LLC; James Behmke; Stephen D. LeBarron

(57) ABSTRACT

In one aspect, a machine learning system for performing predictive analytics on database wait events is disclosed. The machine learning system includes a processor; a memory; and one or more modules stored in the memory and executable by a processor to perform operations including: receive database wait event data indicative wait events associated with database calls running on a monitored database; receive database performance data indicative of performance of the monitored database; correlate the received database wait event data with the received database performance data to obtain a correlation result; predict a performance issue with the monitored database based on the correlation result; and provide a user interface to display the predicted performance issue.

15 Claims, 9 Drawing Sheets

(56) References Cited

U.S. PATENT DOCUMENTS

2005/0086263 A1* 4/2005 Ngai ................ G06F 17/30306
2009/0327854 A1* 12/2009 Chhajer ............ G06F 17/30306
                                                        715/227
2014/0095428 A1* 4/2014 Beresniewicz ... G06F 17/30306
                                                        707/609

* cited by examiner

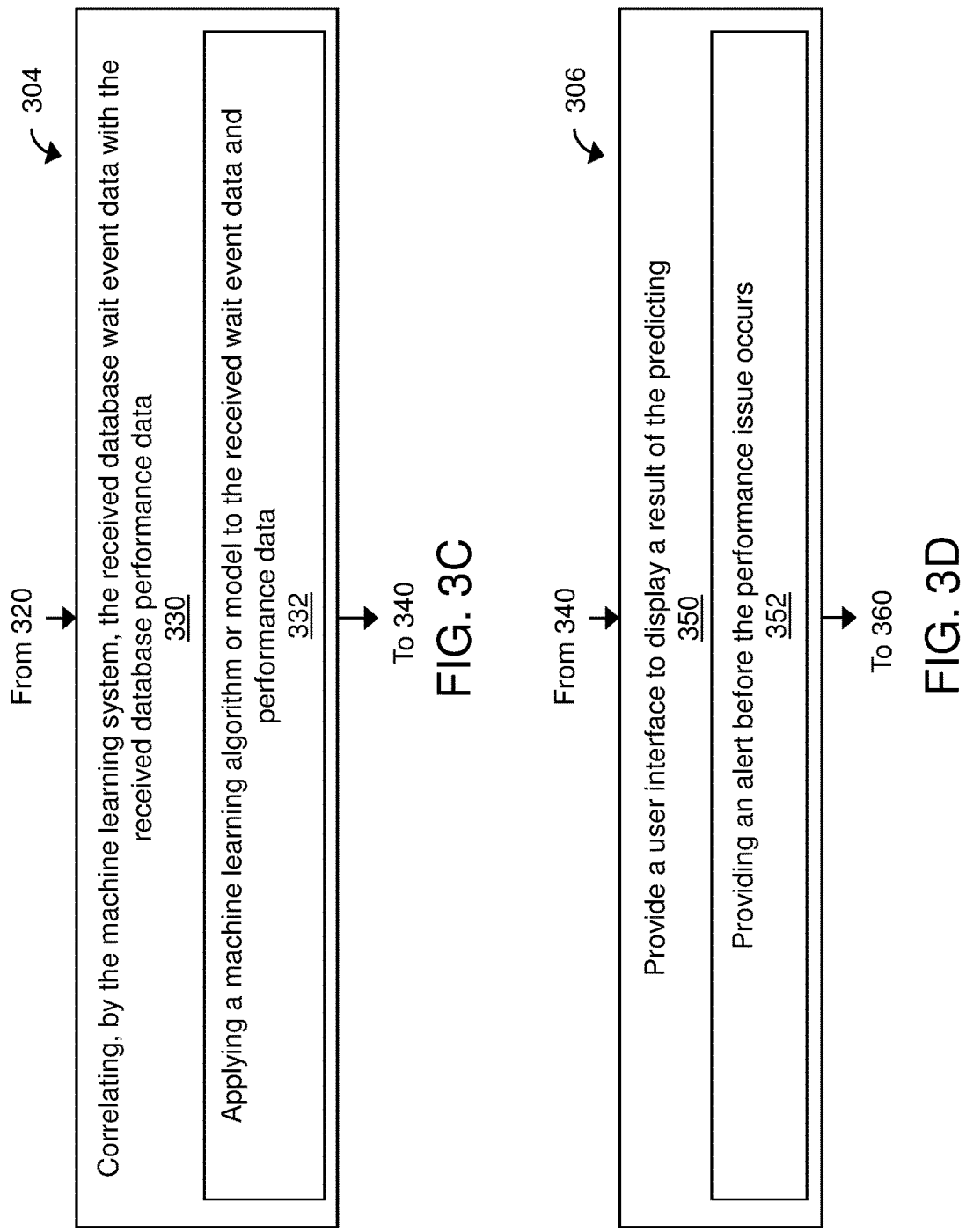

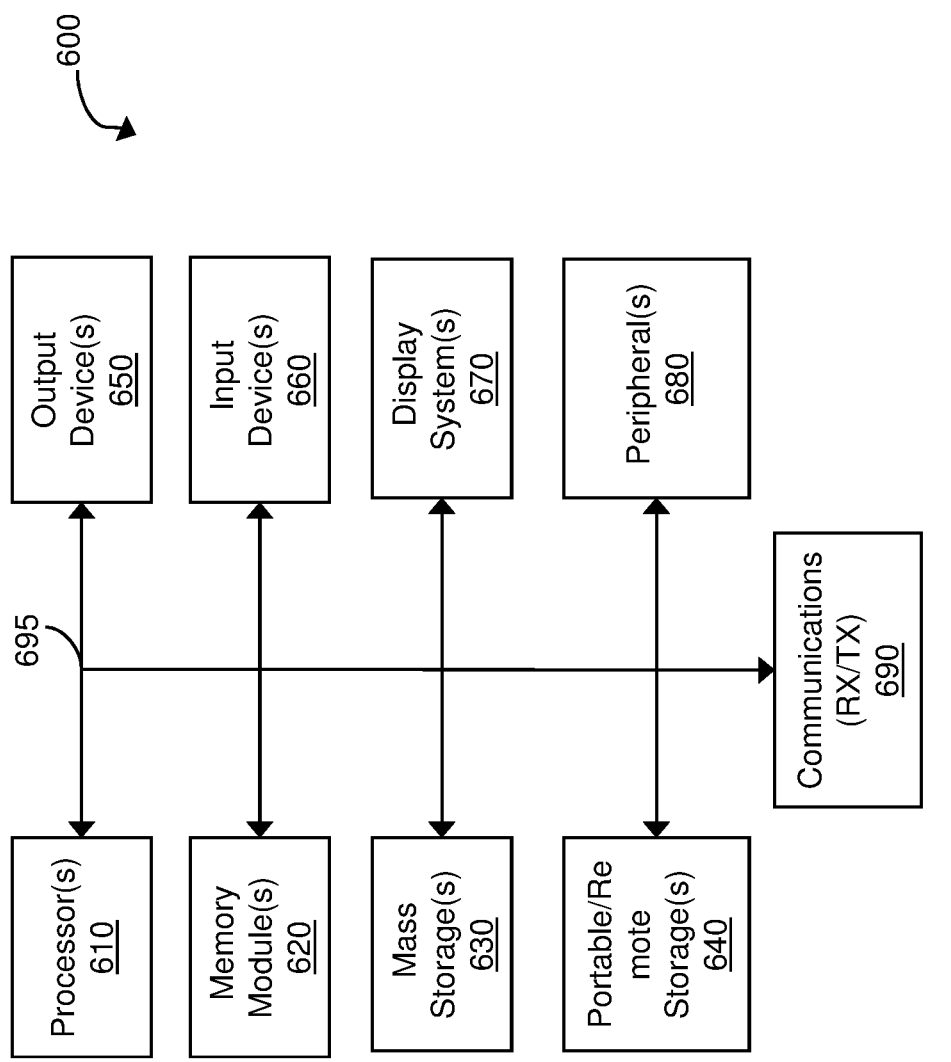

PREDICTIVE ANALYTICS ON DATABASE WAIT EVENTS

BACKGROUND

In pursuit of the highest level of service performance and user experience, companies around the world are engaging in digital transformation by enhancing investments in digital technology and information technology (IT) services. By leveraging the global system of interconnected computer networks afforded by the Internet and the World Wide Web, companies are able to provide ever increasing web services to their clients. The web services may be provided by a web application which uses multiple services and applications to handle a given transaction. The applications may be distributed over several interconnected machines, such as servers, making the topology of the machines that provide the service more difficult to track and monitor.

SUMMARY

Examples of implementations of dynamic query chunking and streaming of results of the chunked queries are disclosed.

In one aspect, a machine learning system for performing predictive analytics on database wait events is disclosed. The machine learning system includes a processor; a memory; and one or more modules stored in the memory and executable by a processor to perform operations including: receive database wait event data indicative wait events associated with database calls running on a monitored database; receive database performance data indicative of performance of the monitored database; correlate the received database wait event data with the received database performance data to obtain a correlation result; predict a performance issue with the monitored database based on the correlation result; and provide a user interface to display the predicted performance issue.

The system can be implemented in various ways include one or more of the following features. For example, the one or more modules can be executable by a processor to correlate the database wait event data with the database performance data by applying a machine learning algorithm. The one or more modules can be executable by a processor to provide the user interface to display the predicted performance issue including providing an alert before the performance issue actually occurs. The one or more modules can be executable by a processor to provide the user interface to display the predicted performance issue including providing a recommendation on how to avoid the performance issue. The recommendation can include a recommendation that a specific process should be removed or fixed. The one or more modules can be executable by a processor to improve an accuracy of the prediction by updating a machine learning model or algorithm used by the machine learning system. The one or more modules can be executable by a processor to improve an accuracy of the prediction include collecting and correlating additional database wait events and database performance data. The database performance data can include performance metric data.

In another aspect, a method for performing predictive analytics on database wait events is disclosed. The method includes receiving database wait event data indicative wait events associated with database calls running on a monitored database; receiving database performance data indicative of performance of the monitored database; correlating the received database wait event data with the received database performance data to obtain a correlation result; predicting a performance issue with the monitored database based on the correlation result; and providing a user interface to display the predicted performance issue.

The method can be implemented in various ways to include one or more of the following features. For example, correlating the database wait event data with the database performance data can include applying a machine learning algorithm. Providing the user interface to display the predicted performance issue can include providing an alert before the performance issue actually occurs. Providing the user interface to display the predicted performance issue can include providing a recommendation on how to avoid the performance issue. The recommendation can include a recommendation that a specific process should be removed or fixed. The method can include improving an accuracy of the prediction by updating a machine learning model or algorithm used by the machine learning system. Improving the accuracy of the prediction can include collecting and correlating additional database wait events and database performance data.

In yet another aspect, a non-transitory computer readable medium embodying instructions when executed by a processor to cause operations to be performed is disclosed. The operations can include: receiving database wait event data indicative wait events associated with database calls running on a monitored database; receiving database performance data indicative of performance of the monitored database; correlating the received database wait event data with the received database performance data to obtain a correlation result; predicting a performance issue with the monitored database based on the correlation result; and providing a user interface to display the predicted performance issue.

The non-transitory computer readable medium can be implemented in various ways to include one or more of the following features. For example, providing the user interface to display the predicted performance issue can include providing an alert before the performance issue actually occurs. Providing the user interface to display the predicted performance issue can include providing a recommendation on how to avoid the performance issue. The operations can include improving an accuracy of the prediction by updating a machine learning model or algorithm used by the machine learning system. Improving the accuracy of the prediction include collecting and correlating additional database wait events and database performance data.

BRIEF DESCRIPTION OF THE DRAWINGS

FIGS. 3A, 3B, 3C, 3D, and 3E are process flow diagrams of exemplary methods 300, 302, 304, 306, and 308 for performing predictive analysis of future performance issues based on correlation of wait events and database performance metrics data.

FIG. 6 is a block diagram of an exemplary computing system implementing the disclosed technology.

DETAILED DESCRIPTION

Figure 1:
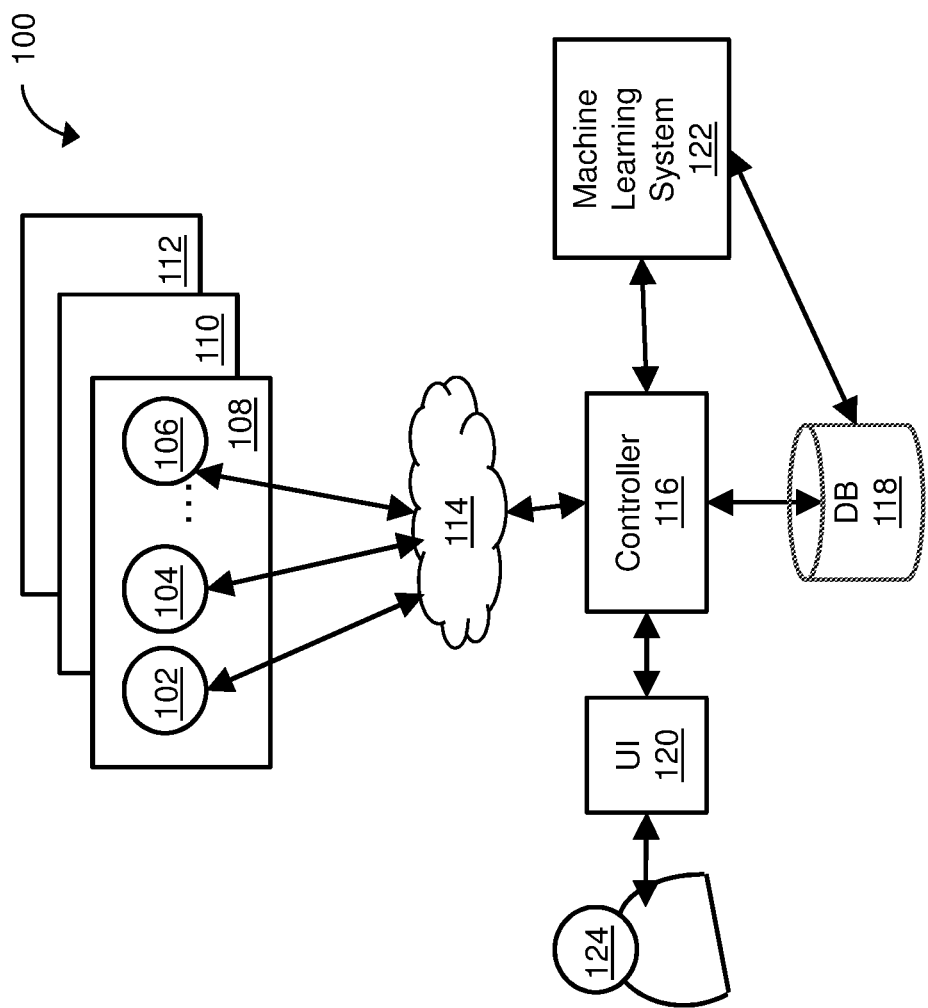
FIG. 1 is a block diagram showing an exemplary monitoring system for performing predictive analytics on database wait events.

The Internet and the World Wide Web have enabled the proliferation of web services available for virtually all types of businesses. Due to the accompanying complexity of the infrastructure supporting the web services, it is becoming increasingly difficult to maintain the highest level of service performance and user experience to keep up with the increase in web services. For example, it can be challenging to piece together monitoring and logging data across disparate systems, tools, and layers in a network architecture. Moreover, even when data can be obtained, it is difficult to directly connect the chain of events and cause and effect.

To maintain the highest level of service performance and user experience, each web application can be monitored to provide insight into information that can negatively affect the overall performance of the web application. For example, information including bottle necks in communication, communication failures and other information regarding performance of the services that provide the web application can be detected. When multiple applications connect to a database and run concurrently, resource constraints can change the behavior of queries being executed. The patterns of concurrency on the database can become more critical for software as a service (SaaS) model where millions of the metadata are by thousands of agents for multiple customers.

Specifically, databases process queries to retrieve certain data, such as metric data on the performance of a business transaction. A lifecycle of processing a query includes multiple wait states from when the query is requested to when the data requested by the query is returned to the requestor. The different wait states are associated corresponding wait times or delays. For example, the query goes through a CPU wait state waiting for the CPU to be available to parse the query. After the query is parsed, information is sent back to the I/O of the system to pull the data requested by the parsed query from the database and load the pulled data into memory. This is the I/O wait state. The data to be pulled waits on space in the memory to be latched and available for the data, and thus goes through a memory wait state. The data loaded into memory is provided to the requestor of the query over a network, and thus goes through a network wait state. Depending on the query, the query may go through any number of these or additional wait states. The accumulation of all the wait states and wait times make up the overall response time and performance of the query.

Each wait state with an unusually long (i.e., longer than a threshold or longer than an average, etc.) wait time can indicate a potential issue with the corresponding entity, such as a CPU issue, an I/O issue, a memory issue, etc. For example, an unusually long parsing time can indicate that the CPU is unavailable or was so busy that the CPU required multiple cycles before being able to parse the query. Moreover, the performance of the database relies on the wait events and the associated wait times. Thus, delay in the CPU wait event can dramatically affect the database performance.

In the beginning, the parameter for monitoring the performance of a database was based on the overall response time and how the I/O structure and system work. Now that each wait time of each wait state can be measured, the individual wait states and wait times are recorded. However, the recorded individual wait states and wait times are generally used for reporting the wait events and associated wait time after the fact and to perform root cause analysis. The recorded wait states and wait times are not utilized for predicting any future events.

Impact of Database Calls Overview

The technology disclosed in this patent document provides for dynamic and efficient application intelligence platforms, systems, devices, methods, and computer readable media including non-transitory type that embody instructions for causing a machine including a processor to perform various operations disclosed in this patent document to identify the impact of database calls made by distributed application over tiers of nodes of machines to the same database. In addition, the disclosed technology can identify the effects of concurrency on database execution plans and database resource utilization. Such patterns of concurrency on database execution plans can be recognized to predict potential performance issues in the future and recommend ideal workload and execution plans for optimum performance.

Specifically, disclosed technology uses machine learning to analyze the recorded wait states and times for a pattern that correlates with a performance issue or anomaly identified in the monitored metric data. For example, a past pattern of significant CPU wait time at a particular time of a day may correlate with an unusually slow average response time of a particular business transaction, it can indicate that the CPU is overloaded during that time and a performance issue can be expected with the business transaction at the same time of a day in the future.

Predictive Analytics Based on Correlation of Database Calls with Performance Issues FIG. 1 is a block diagram showing an exemplary monitoring system 100 for performing predictive analytics based on correlation of database calls with database performance issues. The monitoring system includes multiple (e.g., hundreds or thousands) of agents 102, 104, . . . 106 installed at customer machines where the applications to be monitored are also installed. For a SaaS model, each of multiple customers 108, 110, . . . 112 has multiple agents installed. Each agent collects two types of data: metadata and actual data for each metadata. Metadata includes metric such as average response time, CPU %, load, calls per minute, number of slow calls, and etc. The actual data for each metadata is the actual data behind the metadata collected by the agent. The proliferation of the number of customers and agents can quickly escalate the total number of metrics collected. The collected metrics (e.g., millions) are sent by the agents to a controller 116 installed at a cloud server over the internet 114. The controller stores the collected data in a data store, such as a database DB 118. The controller provides output of the collected data to a user 124 using a user interface 120. The user 124 can also provide input through the user interface 120 for the controller to process. For example, the user interface 120 can be used to receive user input requesting a report of the collected data, a query for the collected data, etc. The system also includes a machine learning system 122 for performing the disclosed predictive analytics based on machine learning of the correlation between database calls and database performance data.

Figure 2:
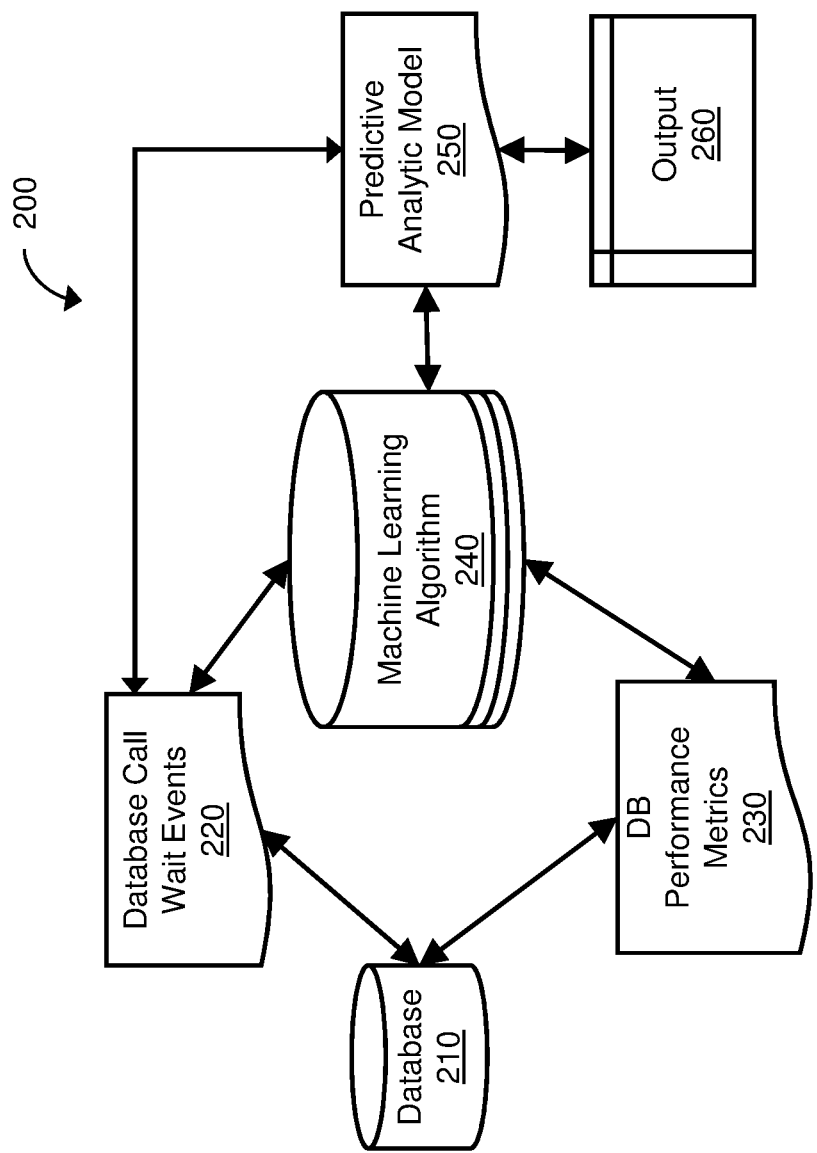
FIG. 2 is a process flow diagram of an exemplary process for predicting database performance issues based on wait state analysis.
Figure 3A:
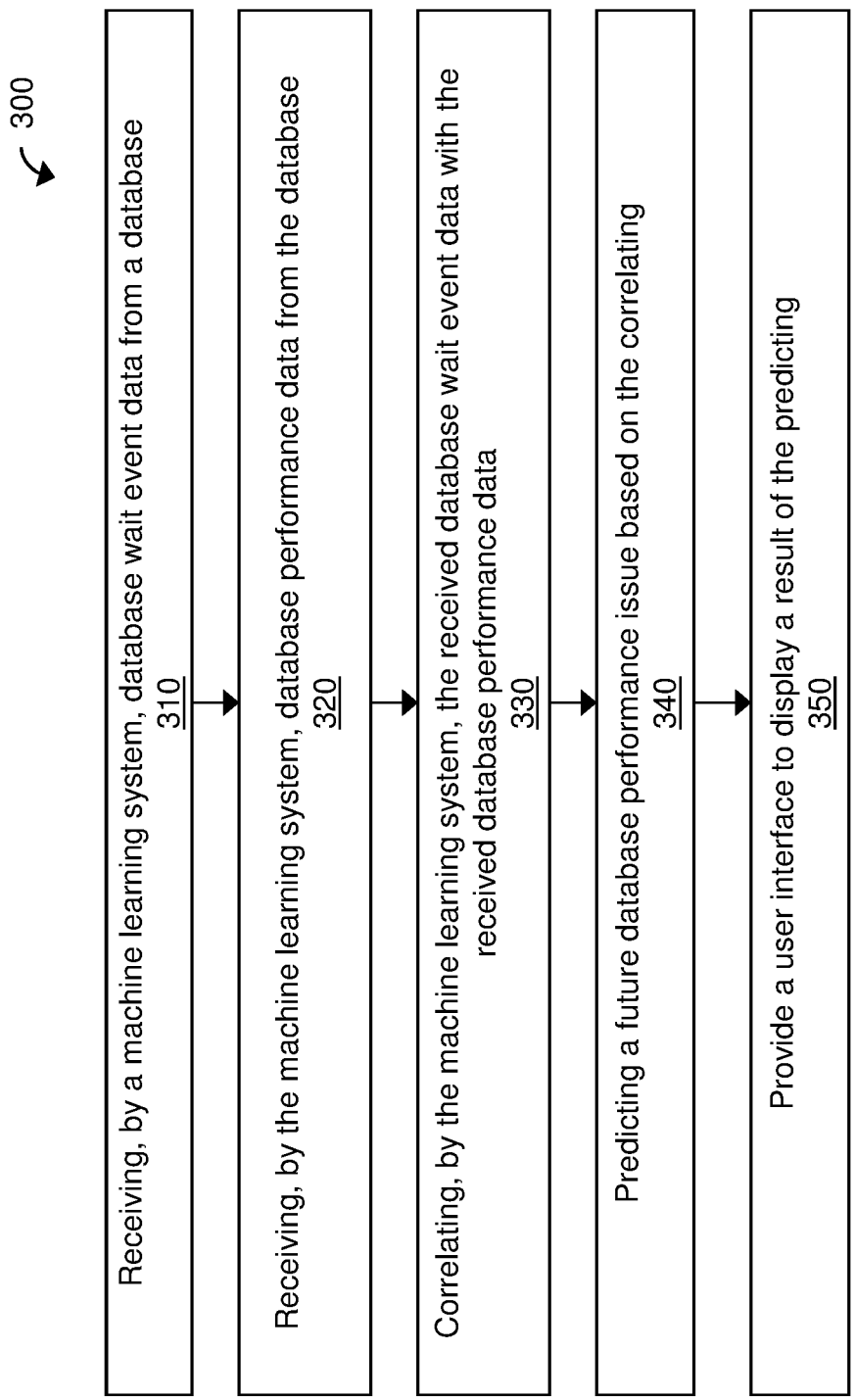
Figure 3B:
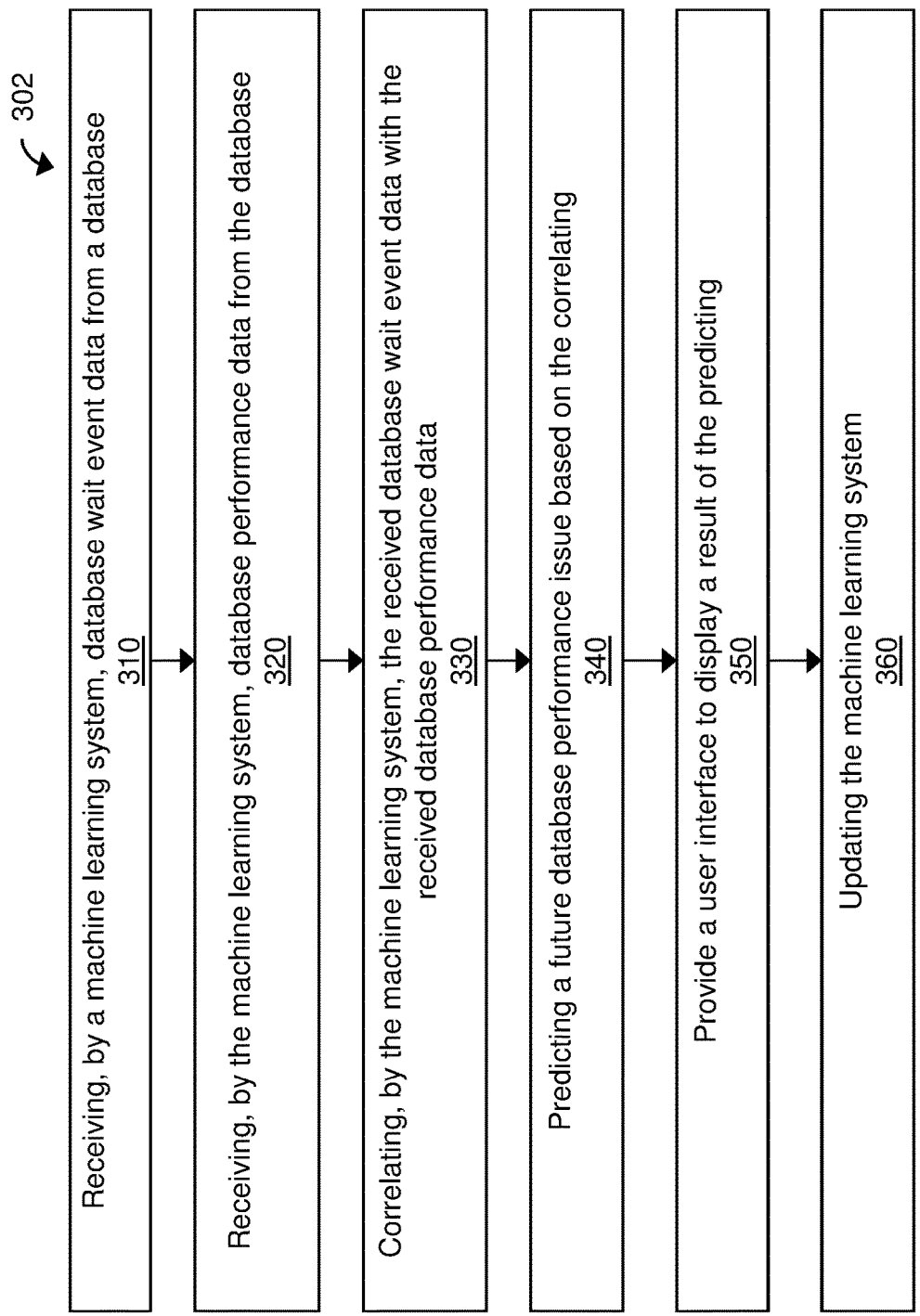
Figure 3E:
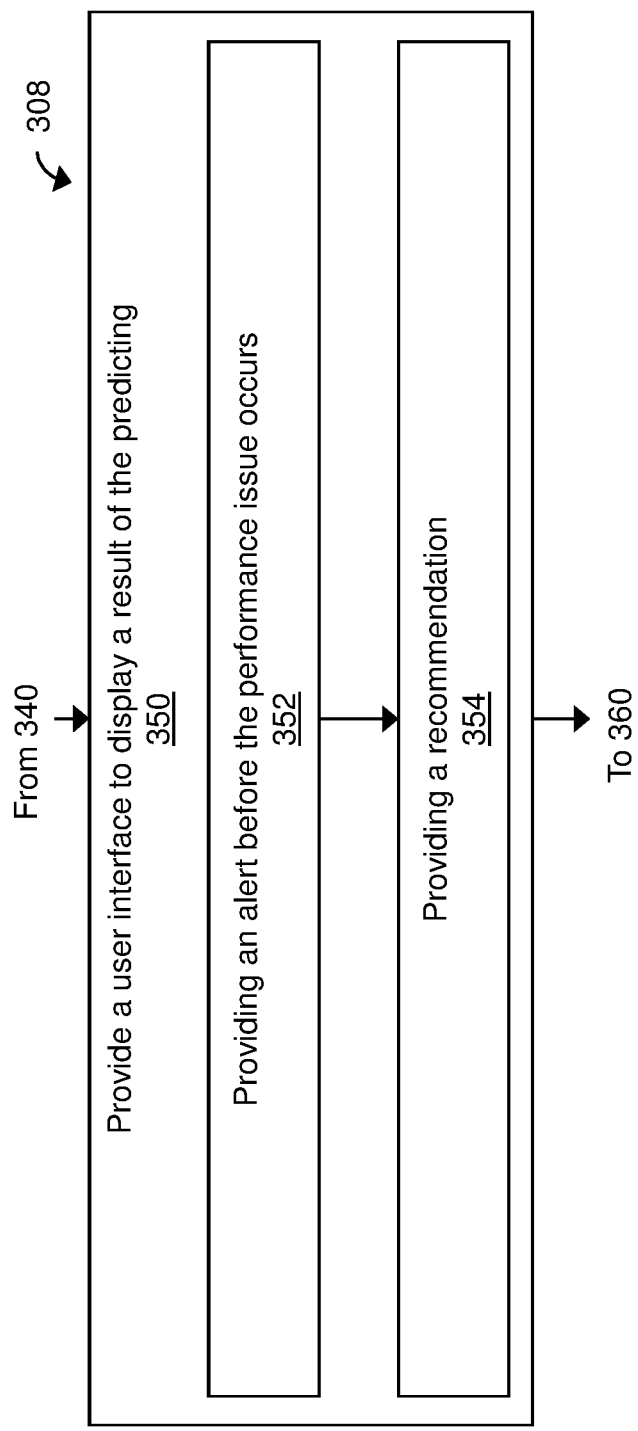

FIG. 2 is a process flow diagram of an exemplary process for predicting database performance issues based on wait state analysis. A machine learning system, such as the machine learning system 122 of FIG. 1 can correlate recorded wait state times for performing queries with recorded database performance metric data to predicatively identify future performance issues with the database. For example, a database 210 of any type including Oracle®, Microsoft® SQL Server, Sybase®, DB2, MySQL, etc. can be associated with a number of database call wait events or states 220. As disclosed above, every database call goes through multiple wait events or states related to the CPU, I/O, memory, and network. These wait events or states are named in the database. These wait states or events and the associated wait times stored in the database are fed to a machine learning algorithm or model 240. The database 210 also stores database performance metrics data 230 related to the CPU, memory, I/O, and network. The database performance metrics data 230 indicate the performance of the database server CPU, memory, I/O, and network usage along with database performance including latencies and ratios. The database performance metrics data 230 collected by the agents and stored in the database are also fed to the machine learning model or algorithm 240.

The machine learning algorithm or model correlates the database call wait events 220 with database performance metrics data 230. In addition, the machine learning algorithm or model continuously receives newly collected and stored database call wait events 220 and the database performance metrics data 230 for correlating them and updating the model or algorithm.

When a given database call wait event 220 is applied to the machine learning algorithm or model 240, a prediction of the database performance is generated 250. The prediction indicates or suggests the future performance of the CPU, memory, latency, etc. can become in a future time. For example, when an increasing I/O latency is fed through the machine learning algorithm or model 240, the prediction 250 may indicate that the database performance will slow down in the future.

The generated prediction for future performance issue with the database is provided as an output to a user through a user interface supported by a controller. The generated output includes a prediction of the database performance in the future and an appropriate alert before the performance issue actually occurs. The accuracy of the prediction is improved through updates of the machine learning model or algorithm based on the additional database call wait events and database performance metric data collected and recorded. The prediction output can provide an opportunity to the user to rectify the impending performance issue before it can cause a bigger issue, such as an outage. In addition, alerts can be created and displayed on a dashboard for predicting the performance problems. For example, in case of an I/O latency, the process causing the I/O latency on the database can be found and removed before more processes start to pile up and increasing the overall latency of the monitored system.

Oracle® Database Example

The disclosed predictive analytics based on the correlation of the database call wait states with database performance metrics data can be applied to any database type as disclosed above. Moreover, the dataflow process illustrated in FIG. 2 can be applied to any database type. For example, multiple queries can be running against an Oracle® database every second. For example, the queries can include select ID, name, description, price from product, etc. The Oracle® database reports to the machine learning model, the wait events that the queries are going through, such as library cache latch, cache buffer chain, database file sequential read, etc. Every query running on the database is going through wait events, such as these. The wait events from the database can be captured for all sessions running on the database periodically, for example, every 15 seconds, etc. Such wait event sampling can provide information on how may sessions are waiting on which event.

The captured database call wait events are fed to the machine learning model as described with respect to FIG. 2 above. In addition, the database performance metrics captured by the agents are stored in the database and reported to the machine learning model. The examples of captured database performance metrics include OS statistics such as CPU read, memory used, I/O (read/write), network (get/send), and performance metrics from Oracle® system statistics. The metrics can include data such as the response time, hit ratio, I/O latency, etc.

The machine learning model correlates the database call wait events data with the database performance metrics data. As the machine learning model continues to learn and update the model from the received wait events data and performance metrics data, the trend of wait events that affect the performance can be determined. For example, if the cache buffer chain latch occurs, it would increase the query response time and CPU utilization. The machine learning model receives the events and performance data continuously to learn about the workload of the particular database.

When a given current wait event information is fed to the machine learning model, the model can predict the potential future performance if the wait event continues in the same way for a prolong period of time. The model learned from previous trends or signatures of wait events to predict that the performance deteriorates when certain wait events start to increase. For example, when 10 sessions wait on the cache buffer chain latch, then the database response time start to increase, causing performance issues. Previous trends show that when 10 sessions wait on the event, more sessions start to wait on the same event due to another activity causing contention. The model predicts that in the next 15 minutes, the performance could deteriorate further if no action is taken.

The output generated from the prediction can be provided to the user to take further action to prevent a bigger issue, such as an outage. For example, the prediction can provide an opportunity to rectify the problem before it can cause an outage. Alerts can be created for the predicted performance issue. In the Oracle Database example, an alert could make the database administrator review the database to determine what process is causing high buffer cache usage and remove or fix the process to allow other sessions to proceed. If the performance issues remain unattended, potentially more sessions can get stuck and cause severe performance issues for the application.

MySQL® Database Example

The disclosed predictive analytics based on the correlation of the database call wait states with database performance metrics data can be applied to any database types as disclosed above. Moreover, the dataflow process illustrated in FIG. 2 can be applied to any database type. For example, multiple queries can be running against a MySQL® database every second. For example, the queries can include select name, max(price) from product with descriptions such as % wheel % group by name, etc. The MySQL® database reports to the machine learning model, the wait events that the queries are going through, such as copying to tmp table on disk, sorting result, converting HEAP to MyISM, etc. Every query running on the database is going through wait events, such as these. The wait events from the database can be captured (e.g., using 'show full process list') for all sessions running on the database periodically, for example, every 15 seconds, etc. Such wait event sampling can provide information on how may sessions are waiting on which event.

The captured database call wait events are fed to the machine learning model as described with respect to FIG. 2 above. In addition, the database performance metrics captured by the agents are stored in the database and reported to the machine learning model. The examples of captured database performance metrics include OS statistics such as CPU read, memory used, I/O (read/write), network (get/send), and performance metrics from MySQL® system statistics. The metrics can include data such as the response time, hit ratio, I/O latency, etc.

The machine learning model correlates the database call wait events data with the database performance metrics data. As the machine learning model continues to learn and update the model from the received wait events data and performance metrics data, the trend of wait events that affect the performance can be determined. For example, the model can learn if 'copy to tmp table to disk' occurs, that would increase I/O and CPU utilization. The machine learning model receives the events and performance data continuously to learn about the workload of the particular database.

When a given current wait event information is fed to the machine learning model, the model can predict the potential future performance if the wait event continues in the same way for a prolong period of time. The model learned from previous trends or signatures of wait events to predict that the performance deteriorates when certain wait events start to increase. For example, when 10 sessions wait on 'copying to tmp table on disk', then the database response time start to increase along with I/O and CPU usage, causing performance issues. Previous trends show that when 10 sessions wait on the event, more sessions start to wait on the same event due to another activity causing contention. The model predicts that in the next 15 minutes, the performance could deteriorate further if no action is taken.

The output generated from the prediction can be provided to the user to take further action to prevent a bigger issue, such as an outage. For example, the prediction can provide an opportunity to rectify the problem before it can cause an outage. Alerts can be created for the predicted performance issue. In the MySQL® Database example, an alert could make the database administrator review the database to determine what process is causing high I/O and CPU usage and remove or fix the process to allow other sessions to proceed. If the performance issues remain unattended, potentially more sessions can get stuck and cause severe performance issues for the application.

FIGS. 3A, 3B, 3C, 3D, and 3E are process flow diagrams of exemplary methods 300, 302, 304, 306, and 308 for performing predictive analysis of future performance issues based on correlation of wait events and database performance metrics data. The method 300 includes having a machine learning system, such as machine learning algorithm or model 240 receive from a database, such as database 210 of any type including Oracle®, Microsoft® SQL Server, Sybase®, DB2, MySQL, etc., wait event data indicative of database call wait events or states (310). As disclosed above, every database call goes through multiple wait events or states related to the CPU, I/O, memory, and network, among others. These wait event data on wait events or states are stored in the database. These wait event data include the wait states or events and the associated wait times stored in the database and are fed to a machine learning algorithm or model. The method also includes receiving from the database, database performance metrics data related to the CPU, memory, I/O, and network (320). The database performance metrics data can indicate the performance of the database server CPU, memory, I/O, and network usage along with database performance including latencies and ratios.

The method 300 includes having the machine learning system correlate the wait event data with database performance metrics data (330). Correlating the wait event data with the database performance metrics data includes applying a machine learning algorithm to the wait event data and the performance metrics data (332). The method 300 includes generating a prediction of the database performance in the future based on the correlation (340). The method 300 includes providing a user interface to output the generated prediction through the user interface (350). Outputting the generated prediction can include providing an alert before the performance issue actually occurs (352). Outputting the generated alert can also include providing a recommendation on how to avoid the performance issue (354). For example, the recommendation can include recommending that a specific process should be removed or fixed.

The method includes improving the accuracy of the prediction by updating the machine learning model or algorithm by collecting and correlating additional database call wait events and database performance metric data (360). Improving the accuracy of the prediction can continue by continuously updating the machine learning model or algorithm by continuously collecting and correlating the wait event data with performance data for the database.

Application Intelligence Platform Architecture

Figure 4:
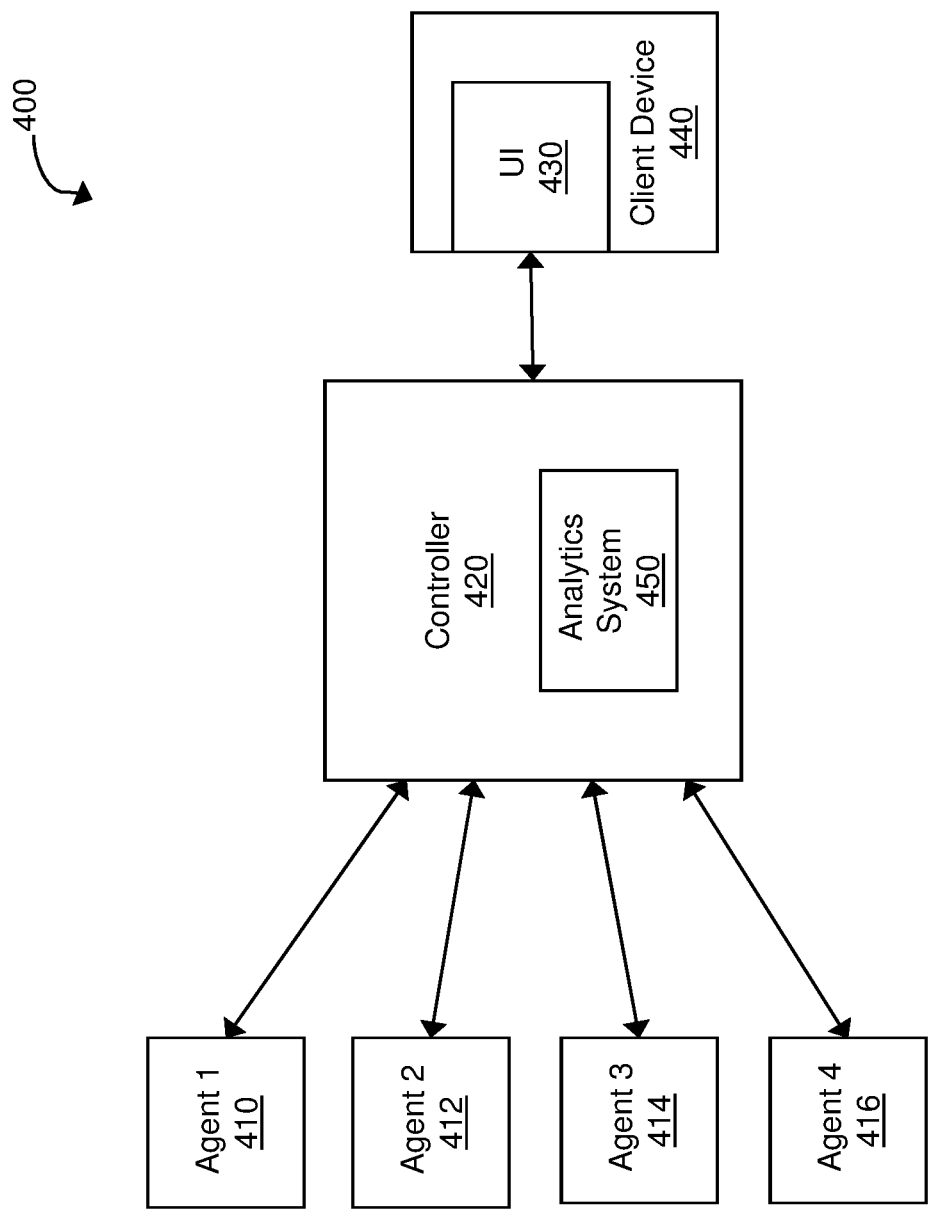
FIG. 4 is a block diagram of an exemplary application intelligence platform for performing predictive analytics on database wait events as disclosed in this patent document.

FIG. 4 is a block diagram of an exemplary application intelligence platform 400 that can implement the disclosed predictive analytics on database call wait events as disclosed in this patent document. The application intelligence platform is a system that monitors and collect metrics of performance data for an application environment being monitored. At the simplest structure, the application intelligence platform includes one or more agents 410, 412, 414, 416 and one or more controllers 420. While FIG. 4 shows four agents communicatively linked to a single controller, the total number of agents and controller can vary based on a number of factors including the number of applications monitored, how distributed the application environment is, the level of monitoring desired, the level of user experience desired, etc.

Controllers and Agents

The controller 420 is the central processing and administration server for the application intelligence platform. The controller 420 serves a browser-based user interface (UI) 430 that is the primary interface for monitoring, analyzing, and troubleshooting the monitored environment. The controller 420 can control and manage monitoring of business transactions distributed over application servers. Specifically, the controller 420 can receive runtime data from agents 410, 412, 414, 416 and coordinators, associate portions of business transaction data, communicate with agents to configure collection of runtime data, and provide performance data and reporting through the interface 430. The interface 430 may be viewed as a web-based interface viewable by a client device 440. In some implementations, a client device 440 can directly communicate with controller 420 to view an interface for monitoring data.

In the Software as a Service (SaaS) implementation, a controller instance 420 is hosted remotely by a provider of the application intelligence platform 400. In the on-premise (On-Prem) implementation, a controller instance 420 is installed locally and self-administered.

The controllers 420 receive data from different agents 410, 412, 414, 416 deployed to monitor applications, databases and database servers, servers, and end user clients for the monitored environment. Any of the agents 410, 412, 414, 416 can be implemented as different types of agents specific monitoring duties. For example, application agents are installed on each server that hosts applications to be monitored. Instrumenting an agent adds an application agent into the runtime process of the application.

Database agents are software (e.g., Java program) installed on a machine that has network access to the monitored databases and the controller. Database agents queries the databases monitored to collect metrics and passes the metrics for display in the metric browser—database monitoring and in the databases pages of the controller UI. Multiple database agents can report to the same controller. Additional database agents can be implemented as backup database agents to take over for the primary database agents during a failure or planned machine downtime. The additional database agents can run on the same machine as the primary agents or on different machines. A database agent can be deployed in each distinct network of the monitored environment. Multiple database agents can run under different user accounts on the same machine.

Standalone machine agents are standalone programs (e.g., standalone Java program) that collect hardware-related performance statistics from the servers in the monitored environment. The standalone machine agents can be deployed on machines that host application servers, database servers, messaging servers, Web servers, etc. A standalone machine agent has an extensible architecture.

End user monitoring (EUM) is performed using browser agents and mobile agents to provide performance information from the point of view of the client, such as a web browser or a mobile native application. Browser agents and mobile agents are unlike other monitoring through application agents, database agents, and standalone machine agents that being on the server. Through EUM, web use (e.g., by real users or synthetic agents), mobile use, or any combination can be monitored depending on the monitoring needs.

Browser agents are small files using web-based technologies, such as JavaScript agents injected into each instrumented web page, as close to the top as possible, as the web page is served and collects data. Once the web page has completed loading, the collected data is bundled into a beacon and sent to the EUM cloud for processing and ready for retrieval by the controller. Browser real user monitoring (Browser RUM) provides insights into the performance of a web application from the point of view of a real or synthetic end user. For example, Browser RUM can determine how specific Ajax or iframe calls are slowing down page load time and how server performance impact end user experience in aggregate or in individual cases.

A mobile agent is a small piece of highly performant code that gets added to the source of the mobile application. Mobile RUM provides information on the native iOS or Android mobile application as the end users actually use the mobile application. Mobile RUM provides visibility into the functioning of the mobile application itself and the mobile application's interaction with the network used and any server-side applications the mobile application communicates with.

The controller 420 can include an analytics system 450 for provide the predictive analytics on database call wait events as disclosed in this patent document. In some implementations, the analytics system 450 can be implemented in a separate machine (e.g., a server) different from the one hosting the controller 420.

Application Intelligence Monitoring

The disclosed technology can provide application intelligence data by monitoring an application environment that includes various services such as web applications served from an application server (e.g., Java virtual machine (JVM), Internet Information Services (IIS), Hypertext Preprocessor (PHP) Web server, etc.), databases or other data stores, and remote services such as message queues and caches. The services in the application environment can interact in various ways to provide a set of cohesive user interactions with the application, such as a set of user services applicable to end user customers.

Application Intelligence Modeling

Entities in the application environment (such as the JBoss service, MQSeries modules, and databases) and the services provided by the entities (such as a login transaction, service or product search, or purchase transaction) are mapped to an application intelligence model. In the application intelligence model, a business transaction represents a particular service provided by the monitored environment. For example, in an e-commerce application, particular real-world services can include user logging in, searching for items, or adding items to the cart. In a content portal, particular real-world services can include user requests for content such as sports, business, or entertainment news. In a stock trading application, particular real-world services can include operations such as receiving a stock quote, buying, or selling stocks.

Business Transactions

A business transaction representation of the particular service provided by the monitored environment provides a view on performance data in the context of the various tiers that participate in processing a particular request. A business transaction represents the end-to-end processing path used to fulfill a service request in the monitored environment. Thus, a business environment is a type of user-initiated action in the monitored environment defined by an entry point and a processing path across application servers, databases, and potentially many other infrastructure components. Each instance of a business transaction is an execution of that transaction in response to a particular user request. A business transaction can be created by detecting incoming requests at an entry point and tracking the activity associated with request at the originating tier and across distributed components in the application environment. A flow map can be generated for a business transaction that shows the touch points for the business transaction in the application environment.

Performance monitoring can be oriented by business transaction to focus on the performance of the services in the application environment from the perspective of end users. Performance monitoring based on business transaction can provide information on whether a service s available (e.g., users can log in, check out, or view their data), response times for users, and the cause of problems when the problems occur.

Business Applications

A business application is the top-level container in the application intelligence model. A business application contains a set of related services and business transactions. In some implementations, a single business application may be needed to model the environment. In some implementations, the application intelligence model of the application environment can be divided into several business applications.

Business applications can be organized differently based on the specifics of the application environment. One consideration is to organize the business applications in a way that reflects work teams in a particular organization, since role-based access controls in the Controller are oriented by business application.

Nodes

A node in the application intelligence model corresponds to a monitored server or JVM in the application environment. A node is the smallest unit of the modeled environment. In general, a node corresponds to an individual application server, JVM, or CLR on which a monitoring Agent is installed. Each node identifies itself in the application intelligence model. The Agent installed at the node is configured to specify the name of the node, tier, and business application under which the Agent reports data to the Controller.

Tiers

Business applications contain tiers, the unit in the application intelligence model that includes one or more nodes. Each node represents an instrumented service (such as a web application). While a node can be a distinct application in the application environment, in the application intelligence model, a node is a member of a tier, which, along with possibly many other tiers, make up the overall logical business application.

Tiers can be organized in the application intelligence model depending on a mental model of the monitored application environment. For example, identical nodes can be grouped into a single tier (such as a cluster of redundant servers). In some implementations, any set of nodes, identical or not, can be grouped for the purpose of treating certain performance metrics as a unit into a single tier.

The traffic in a business application flows among tiers and can be visualized in a flow map using lines among tiers. In addition, the lines indicating the traffic flows among tiers can be annotated with performance metrics. In the application intelligence model, there may not be any interaction among nodes within a single tier. Also, in some implementations, an application agent node cannot belong to more than one tier. Similarly, a machine agent cannot belong to more than one tier. However, more than one machine agent can be installed on a machine.

Backend System

A backend is a component that participates in the processing of a business transaction instance. A backend is not instrumented by an agent. A backend may be a web server, database, message queue, or other type of service. The agent recognizes calls to these backend services from instrumented code (called exit calls). When a service is not instrumented and cannot continue the transaction context of the call, the agent determines that the service is a backend component. The agent picks up the transaction context at the response at the backend and continues to follow the context of the transaction from there.

Performance information is available for the backend call. For detailed transaction analysis for the leg of a transaction processed by the backend, the database, web service, or other application need to be instrumented.

Baselines and Thresholds

The application intelligence platform uses both self-learned baselines and configurable thresholds to help identify application issues. A complex distributed application has a large number of performance metrics and each metric is important in one or more contexts. In such environments, it is difficult to determine the values or ranges that are normal for a particular metric; set meaningful thresholds on which to base and receive relevant alerts; and determine what is a "normal" metric when the application or infrastructure undergoes change. For these reasons, the disclosed application intelligence platform can perform anomaly detection based on dynamic baselines or thresholds.

The disclosed application intelligence platform automatically calculates dynamic baselines for the monitored metrics, defining what is "normal" for each metric based on actual usage. The application intelligence platform uses these baselines to identify subsequent metrics whose values fall out of this normal range. Static thresholds that are tedious to set up and, in rapidly changing application environments, error-prone, are no longer needed.

The disclosed application intelligence platform can use configurable thresholds to maintain service level agreements (SLAs) and ensure optimum performance levels for your system by detecting slow, very slow, and stalled transactions. Configurable thresholds provide a flexible way to associate the right business context with a slow request to isolate the root cause.

Health Rules, Policies, and Actions

In addition, health rules can be set up with conditions that use the dynamically generated baselines to trigger alerts or initiate other types of remedial actions when performance problems are occurring or may be about to occur.

For example, dynamic baselines can be used to automatically establish what is considered normal behavior for a particular application. Policies and health rules can be used against baselines or other health indicators for a particular application to detect and troubleshoot problems before users are affected. Health rules can be used to define metric conditions to monitor, such as when the "average response time is four times slower than the baseline". The health rules can be created and modified based on the monitored application environment.

Examples of health rules for testing business transaction performance can include business transaction response time and business transaction error rate. For example, health rule that tests whether the business transaction response time is much higher than normal can define a critical condition as the combination of an average response time greater than the default baseline by 3 standard deviations and a load greater than 50 calls per minute. This health rule can define a warning condition as the combination of an average response time greater than the default baseline by 2 standard deviations and a load greater than 100 calls per minute. The health rule that tests whether the business transaction error rate is much higher than normal can define a critical condition as the combination of an error rate greater than the default baseline by 3 standard deviations and an error rate greater than 10 errors per minute and a load greater than 50 calls per minute. This health rule can define a warning condition as the combination of an error rate greater than the default baseline by 2 standard deviations and an error rate greater than 5 errors per minute and a load greater than 50 calls per minute.

Policies can be configured to trigger actions when a health rule is violated or when any event occurs. Triggered actions can include notifications, diagnostic actions, auto-scaling capacity, running remediation scripts.

Metrics

Most of the metrics relate to the overall performance of the application or business transaction (e.g., load, average response time, error rate, etc.) or of the application server infrastructure (e.g., percentage CPU busy, percentage of memory used, etc.). The Metric Browser in the controller UI can be used to view all of the metrics that the agents report to the controller.

In addition, special metrics called information points can be created to report on how a given business (as opposed to a given application) is performing. For example, the performance of the total revenue for a certain product or set of products can be monitored. Also, information points can be used to report on how a given code is performing, for example how many times a specific method is called and how long it is taking to execute. Moreover, extensions that use the machine agent can be created to report user defined custom metrics. These custom metrics are base-lined and reported in the controller, just like the built-in metrics.

All metrics can be accessed programmatically using a Representational State Transfer (REST) API that returns either the JavaScript Object Notation (JSON) or the eXtensible Markup Language (XML) format. Also, the REST API can be used to query and manipulate the application environment.

Snapshots

Snapshots provide a detailed picture of a given application at a certain point in time. Snapshots usually include call graphs that allow that enables drilling down to the line of code that may be causing performance problems. The most common snapshots are transaction snapshots.

Exemplary Implementation of Application Intelligence Platform

Figure 5:
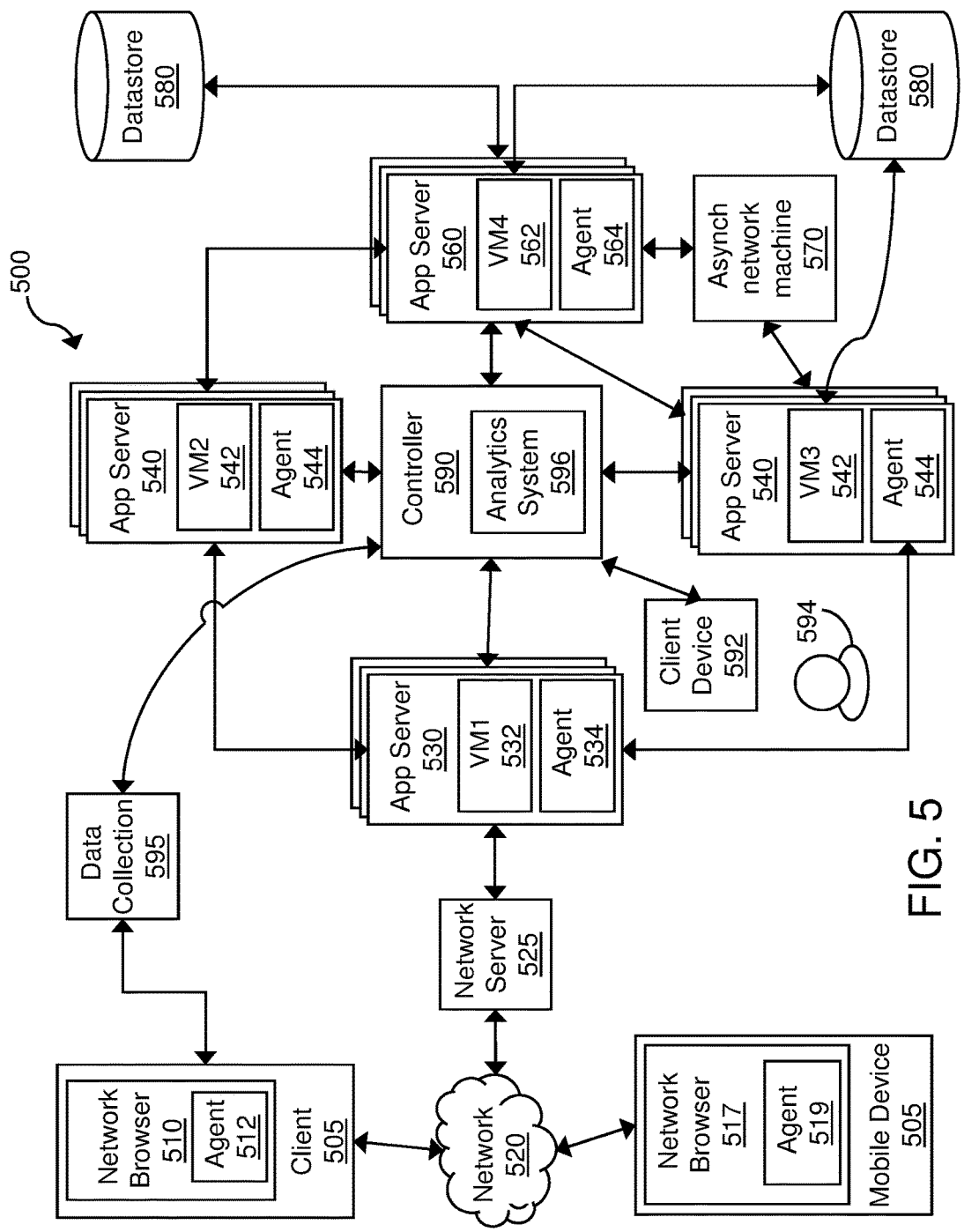
FIG. 5 is a block diagram of an exemplary system for performing predictive analytics on database wait events as disclosed in this patent document, including the processes disclosed with respect to FIGS. 1-4.

FIG. 5 is a block diagram of an exemplary system 500 for providing predictive analytics on database call wait events as disclosed in this patent document, including the processes disclosed with respect to FIGS. 1-4. The system 500 in FIG. 5 includes client device 505 and 592, mobile device 515, network 520, network server 525, application servers 530, 540, 550 and 560, asynchronous network machine 570, data stores 580 and 585, controller 590, and data collection server 595. The controller 590 can include an analytics system 596 for providing predictive analytics on database call wait events as disclosed in this patent document. In some implementations, the analytics system 596 can be implemented in a separate machine (e.g., a server) different from the one hosting the controller 590.

Client device 505 may include network browser 510 and be implemented as a computing device, such as for example a laptop, desktop, workstation, or some other computing device. Network browser 510 may be a client application for viewing content provided by an application server, such as application server 530 via network server 525 over network 520.

Network browser 510 may include agent 512. Agent 512 may be installed on network browser 510 and/or client 505 as a network browser add-on, downloading the application to the server, or in some other manner. Agent 512 may be executed to monitor network browser 510, the operating system of client 505, and any other application, API, or other component of client 505. Agent 512 may determine network browser navigation timing metrics, access browser cookies, monitor code, and transmit data to data collection 560, controller 590, or another device. Agent 512 may perform other operations related to monitoring a request or a network at client 505 as discussed herein.

Mobile device 515 is connected to network 520 and may be implemented as a portable device suitable for sending and receiving content over a network, such as for example a mobile phone, smart phone, tablet computer, or other portable device. Both client device 505 and mobile device 515 may include hardware and/or software configured to access a web service provided by network server 525.

Mobile device 515 may include network browser 517 and an agent 519. Mobile device may also include client applications and other code that may be monitored by agent 519. Agent 519 may reside in and/or communicate with network browser 517, as well as communicate with other applications, an operating system, APIs and other hardware and software on mobile device 515. Agent 519 may have similar functionality as that described herein for agent 512 on client 505, and may repot data to data collection server 560 and/or controller 590.

Network 520 may facilitate communication of data among different servers, devices and machines of system 500 (some connections shown with lines to network 520, some not shown). The network may be implemented as a private network, public network, intranet, the Internet, a cellular network, Wi-Fi network, VoIP network, or a combination of one or more of these networks. The network 520 may include one or more machines such as load balance machines and other machines.

Network server 525 is connected to network 520 and may receive and process requests received over network 520. Network server 525 may be implemented as one or more servers implementing a network service, and may be implemented on the same machine as application server 530 or one or more separate machines. When network 520 is the Internet, network server 525 may be implemented as a web server.

Application server 530 communicates with network server 525, application servers 540 and 550, and controller 590. Application server 550 may also communicate with other machines and devices (not illustrated in FIG. 5). Application server 530 may host an application or portions of a distributed application. The host application 532 may be in one of many platforms, such as including a Java, PHP, .Net, and Node.JS, be implemented as a Java virtual machine, or include some other host type. Application server 530 may also include one or more agents 534 (i.e. "modules"), including a language agent, machine agent, and network agent, and other software modules. Application server 530 may be implemented as one server or multiple servers as illustrated in FIG. 5.

Application 532 and other software on application server 530 may be instrumented using byte code insertion, or byte code instrumentation (BCI), to modify the object code of the application or other software. The instrumented object code may include code used to detect calls received by application 532, calls sent by application 532, and communicate with agent 534 during execution of the application. BCI may also be used to monitor one or more sockets of the application and/or application server in order to monitor the socket and capture packets coming over the socket.

In some embodiments, server 530 may include applications and/or code other than a virtual machine. For example, servers 530, 540, 550, and 560 may each include Java code, .Net code, PHP code, Ruby code, C code, C++ or other binary code to implement applications and process requests received from a remote source. References to a virtual machine with respect to an application server are intended to be for exemplary purposes only.

Agents 534 on application server 530 may be installed, downloaded, embedded, or otherwise provided on application server 530. For example, agents 534 may be provided in server 530 by instrumentation of object code, downloading the agents to the server, or in some other manner. Agent 534 may be executed to monitor application server 530, monitor code running in a virtual machine 532 (or other program language, such as a PHP, .Net, or C program), machine resources, network layer data, and communicate with byte instrumented code on application server 530 and one or more applications on application server 530.

Each of agents 534, 544, 554 and 564 may include one or more agents, such as language agents, machine agents, and network agents. A language agent may be a type of agent that is suitable to run on a particular host. Examples of language agents include a JAVA agent, .Net agent, PHP agent, and other agents. The machine agent may collect data from a particular machine on which it is installed. A network agent may capture network information, such as data collected from a socket.

Agent 534 may detect operations such as receiving calls and sending requests by application server 530, resource usage, and incoming packets. Agent 534 may receive data, process the data, for example by aggregating data into metrics, and transmit the data and/or metrics to controller 590. Agent 534 may perform other operations related to monitoring applications and application server 530 as discussed herein. For example, agent 534 may identify other applications, share business transaction data, aggregate detected runtime data, and other operations.

An agent may operate to monitor a node, tier or nodes or other entity. A node may be a software program or a hardware component (e.g., memory, processor, and so on). A tier of nodes may include a plurality of nodes which may process a similar business transaction, may be located on the same server, may be associated with each other in some other way, or may not be associated with each other.

A language agent may be an agent suitable to instrument or modify, collect data from, and reside on a host. The host may be a Java, PHP, .Net, Node.JS, or other type of platform. Language agent may collect flow data as well as data associated with the execution of a particular application. The language agent may instrument the lowest level of the application to gather the flow data. The flow data may indicate which tier is communicating with which tier and on which port. In some instances, the flow data collected from the language agent includes a source IP, a source port, a destination IP, and a destination port. The language agent may report the application data and call chain data to a controller. The language agent may report the collected flow data associated with a particular application to a network agent.

A network agent may be a standalone agent that resides on the host and collects network flow group data. The network flow group data may include a source IP, destination port, destination IP, and protocol information for network flow received by an application on which network agent is installed. The network agent may collect data by intercepting and performing packet capture on packets coming in from a one or more sockets. The network agent may receive flow data from a language agent that is associated with applications to be monitored. For flows in the flow group data that match flow data provided by the language agent, the network agent rolls up the flow data to determine metrics such as TCP throughput, TCP loss, latency and bandwidth. The network agent may then report the metrics, flow group data, and call chain data to a controller. The network agent may also make system calls at an application server to determine system information, such as for example a host status check, a network status check, socket status, and other information.

A machine agent may reside on the host and collect information regarding the machine which implements the host. A machine agent may collect and generate metrics from information such as processor usage, memory usage, and other hardware information.

Each of the language agent, network agent, and machine agent may report data to the controller. Controller 590 may be implemented as a remote server that communicates with agents located on one or more servers or machines. The controller may receive metrics, call chain data and other data, correlate the received data as part of a distributed transaction, and report the correlated data in the context of a distributed application implemented by one or more monitored applications and occurring over one or more monitored networks. The controller may provide reports, one or more user interfaces, and other information for a user.

Agent 534 may create a request identifier for a request received by server 530 (for example, a request received by a client 505 or 515 associated with a user or another source). The request identifier may be sent to client 505 or mobile device 515, whichever device sent the request. In embodiments, the request identifier may be created when a data is collected and analyzed for a particular business transaction.

Each of application servers 540, 550 and 560 may include an application and agents. Each application may run on the corresponding application server. Each of applications 542, 552 and 562 on application servers 540-560 may operate similarly to application 532 and perform at least a portion of a distributed business transaction. Agents 544, 554 and 564 may monitor applications 542-562, collect and process data at runtime, and communicate with controller 590. The applications 532, 542, 552 and 562 may communicate with each other as part of performing a distributed transaction. In particular, each application may call any application or method of another virtual machine.

Asynchronous network machine 570 may engage in asynchronous communications with one or more application servers, such as application server 550 and 560. For example, application server 550 may transmit several calls or messages to an asynchronous network machine. Rather than communicate back to application server 550, the asynchronous network machine may process the messages and eventually provide a response, such as a processed message, to application server 560. Because there is no return message from the asynchronous network machine to application server 550, the communications among them are asynchronous.

Data stores 580 and 585 may each be accessed by application servers such as application server 550. Data store 585 may also be accessed by application server 550. Each of data stores 580 and 585 may store data, process data, and return queries received from an application server. Each of data stores 580 and 585 may or may not include an agent.

Controller 590 may control and manage monitoring of business transactions distributed over application servers 530-560. In some embodiments, controller 590 may receive application data, including data associated with monitoring client requests at client 505 and mobile device 515, from data collection server 560. In some embodiments, controller 590 may receive application monitoring data and network data from each of agents 512, 519, 534, 544 and 554. Controller 590 may associate portions of business transaction data, communicate with agents to configure collection of data, and provide performance data and reporting through an interface. The interface may be viewed as a web-based interface viewable by client device 592, which may be a mobile device, client device, or any other platform for viewing an interface provided by controller 590. In some embodiments, a client device 592 may directly communicate with controller 590 to view an interface for monitoring data.

Client device 592 may include any computing device, including a mobile device or a client computer such as a desktop, work station or other computing device. Client computer 592 may communicate with controller 590 to create and view a custom interface. In some embodiments, controller 590 provides an interface for creating and viewing the custom interface as a content page, e.g., a web page, which may be provided to and rendered through a network browser application on client device 592.

Applications 532, 542, 552 and 562 may be any of several types of applications. Examples of applications that may implement applications 532-562 include a Java, PHP, .Net, Node.JS, and other applications.

FIG. 6 is a block diagram of a computer system 600 for implementing the present technology. System 600 of FIG. 6 may be implemented in the contexts of the likes of clients 605, 692, network server 625, servers 630, 640, 650, 660, a synchronous network machine 670 and controller 690.

The computing system 600 of FIG. 6 includes one or more processors 610 and memory 620. Main memory 620 stores, in part, instructions and data for execution by processor 610. Main memory 610 can store the executable code when in operation. The system 600 of FIG. 6 further includes a mass storage device 630, portable storage medium drive(s) 640, output devices 650, user input devices 660, a graphics display 670, and peripheral devices 680.

The components shown in FIG. 6 are depicted as being connected via a single bus 690. However, the components may be connected through one or more data transport means. For example, processor unit 610 and main memory 620 may be connected via a local microprocessor bus, and the mass storage device 630, peripheral device(s) 680, portable or remote storage device 640, and display system 670 may be connected via one or more input/output (I/O) buses.

Mass storage device 630, which may be implemented with a magnetic disk drive or an optical disk drive, is a non-volatile storage device for storing data and instructions for use by processor unit 610. Mass storage device 630 can store the system software for implementing embodiments of the present invention for purposes of loading that software into main memory 620.

Portable storage device 640 operates in conjunction with a portable non-volatile storage medium, such as a compact disk, digital video disk, magnetic disk, flash storage, etc. to input and output data and code to and from the computer system 600 of FIG. 6. The system software for implementing embodiments of the present invention may be stored on such a portable medium and input to the computer system 600 via the portable storage device 640.

Input devices 660 provide a portion of a user interface. Input devices 660 may include an alpha-numeric keypad, such as a keyboard, for inputting alpha-numeric and other information, or a pointing device, such as a mouse, a trackball, stylus, or cursor direction keys. Additionally, the system 600 as shown in FIG. 6 includes output devices 650. Examples of suitable output devices include speakers, printers, network interfaces, and monitors.

Display system 670 may include a liquid crystal display (LCD) or other suitable display device. Display system 670 receives textual and graphical information, and processes the information for output to the display device.

Peripherals 680 may include any type of computer support device to add additional functionality to the computer system. For example, peripheral device(s) 680 may include a modem or a router.

The components contained in the computer system 600 of FIG. 6 can include a personal computer, hand held computing device, telephone, mobile computing device, workstation, server, minicomputer, mainframe computer, or any other computing device. The computer can also include different bus configurations, networked platforms, multi-processor platforms, etc. Various operating systems can be used including Unix, Linux, Windows, Apple OS, and other suitable operating systems, including mobile versions.

When implementing a mobile device such as smart phone or tablet computer, the computer system 600 of FIG. 6 may include one or more antennas, radios, and other circuitry for communicating over wireless signals, such as for example communication using Wi-Fi, cellular, or other wireless signals.

While this patent document contains many specifics, these should not be construed as limitations on the scope of any invention or of what may be claimed, but rather as descriptions of features that may be specific to particular embodiments of particular inventions. Certain features that are described in this patent document in the context of separate embodiments can also be implemented in combination in a single embodiment. Conversely, various features that are described in the context of a single embodiment can also be implemented in multiple embodiments separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. Moreover, the separation of various system components in the embodiments described in this patent document should not be understood as requiring such separation in all embodiments.

Only a few implementations and examples are described and other implementations, enhancements and variations can be made based on what is described and illustrated in this patent document.

What is claimed is:

1. A machine learning system for performing predictive analytics on database wait events, the machine learning system including:
a processor;
a memory; and
one or more modules stored in the memory and executable by a processor to perform operations including:
receive database wait event data indicative of an individual wait time for one of a plurality of wait states associated with a database processing query running on a monitored database, wherein the database wait event data is collected and monitored by a plurality of agents running on remote devices;
receive database performance data indicative of performance of the monitored database;
correlate, by a machine learning algorithm, the received database wait event data with the received database performance data to obtain a correlation result;
receiving additional database wait event data and database performance data;
continuously update the machine learning algorithm based on the additional received database call wait event data and database performance data;

predict a performance issue with the monitored database based on the correlation result; and provide the predicted performance issue to a user interface to display the predicted performance issue.

2. The system of claim 1, wherein the one or more modules are executable by a processor to provide the user interface to display the predicted performance issue including providing an alert before the performance issue actually occurs.

3. The system of claim 1, wherein the one or more modules are executable by a processor to provide the user interface to display the predicted performance issue including providing a recommendation on how to avoid the performance issue.

4. The system of claim 3, wherein the recommendation includes a recommendation that a specific process should be removed or fixed.

5. The system of claim 1, wherein the database performance data include performance metric data.

6. A method for performing predictive analytics on database wait events, the method including:

receiving, at a learning machine in a computer network, database wait event data indicative of an individual wait time for one of a plurality of wait states associated with a database processing query running on a monitored database, wherein the database wait event data is collected and monitored by a plurality of agents running on remote devices;

receiving database performance data indicative of performance of the monitored database;

correlating the received database wait event data with the received database performance data to obtain a correlation result;

receiving additional database wait event data and database performance data;

continuously updating the machine learning algorithm based on the additional database call wait event data and database performance data;

predicting a performance issue with the monitored database based on the correlation result; and providing the predicted performance issue to a user interface to display the predicted performance issue.

7. The method of claim 6, wherein providing the user interface to display the predicted performance issue include providing an alert before the performance issue actually occurs.

8. The method of claim 6, wherein providing the user interface to display the predicted performance issue include providing a recommendation on how to avoid the performance issue.

9. The method of claim 8, wherein the recommendation includes a recommendation that a specific process should be removed or fixed.

10. A non-transitory computer readable storage medium embodying instructions when executed by a processor to cause operations to be performed including:

receiving database wait event data indicative of an individual wait time for one of a plurality of wait states associated with a database processing query running on a monitored database, wherein the database wait event data is collected and monitored by a plurality of agents running on remote devices;

receiving database performance data indicative of performance of the monitored database;

correlating the received database wait event data with the received database performance data to obtain a correlation result;

receiving additional database wait event data and database performance data;

continuously update the machine learning algorithm based on the additional received database call wait event data and database performance data;

predicting a performance issue with the monitored database based on the correlation result; and providing the predicted performance issue to a user interface to display the predicted performance issue.

11. The non-transitory computer readable storage medium of claim 10, wherein providing the user interface to display the predicted performance issue include providing an alert before the performance issue actually occurs.

12. The non-transitory computer readable storage medium of claim 10, wherein providing the user interface to display the predicted performance issue include providing a recommendation on how to avoid the performance issue.

13. The non-transitory computer readable storage medium of claim 10, wherein the individual wait time is a central processing unit wait time during the database processing query, an Input/Output wait time of the database processing query or a memory wait time associated with the database processing query.

14. The method of claim 6, wherein the individual wait time is a central processing unit wait time during the database processing query, an Input/Output wait time of the database processing query or a memory wait time associated with the database processing query.

15. The system of claim 1, wherein the individual wait time is a central processing unit wait time during the database processing query, an Input/Output wait time of the database processing query or a memory wait time associated with the database processing query.

* * * * *

UNITED STATES PATENT AND TRADEMARK OFFICE
CERTIFICATE OF CORRECTION

PATENT NO. : 10,452,463 B2
APPLICATION NO. : 15/224560
DATED : October 22, 2019
INVENTOR(S) : Apun Hiran et al.

Page 1 of 1

It is certified that error appears in the above-identified patent and that said Letters Patent is hereby corrected as shown below:

In the Specification

Column 4, Line 66, please amend as shown:
recorded database performance metric data to predictively Column 10, Line 56, please amend as shown:
provide information on whether a service is available (e.g., Column 11, Line 5, please amend as shown:
based access controls in the Controller UI are oriented by Signed and Sealed this
Twenty-fourth Day of March, 2020

Andrei Iancu
*Director of the United States Patent and Trademark Office*